United States Patent [19]
Scott

[11] Patent Number: 5,413,248
[45] Date of Patent: May 9, 1995

[54] MAPLE SYRUP DISPENSER

[76] Inventor: David N. Scott, 130 Coleman Rd., Walden, N.Y. 12586

[21] Appl. No.: 149,513

[22] Filed: Nov. 9, 1993

[51] Int. Cl.$^6$ .............................................. B67D 5/22
[52] U.S. Cl. ................................ 222/51; 222/111; 116/228
[58] Field of Search ................ 222/51, 111, 482, 543, 222/571; 73/309, 321; 116/228

[56] References Cited

U.S. PATENT DOCUMENTS

| | | | |
|---|---|---|---|
| 341,337 | 5/1886 | Lewis | 222/543 |
| 1,523,911 | 1/1925 | Staemeli | 222/543 |
| 2,105,370 | 1/1938 | Paul | 222/543 |
| 2,700,222 | 1/1955 | Swenson | 73/321 |
| 4,863,067 | 9/1989 | Krall | 222/111 |
| 4,917,270 | 4/1990 | Simon | 222/111 |
| 5,050,432 | 9/1991 | Barritt | 73/321 |

*Primary Examiner*—Andres Kashnikow
*Assistant Examiner*—Philippe Derakshani

[57] ABSTRACT

A bottle for storing and dispensing maple syrup and like fluids comprising, in combination a one piece container having a generally circular horizontal bottom wall and upstanding side walls of an uneven contour horizontally, vertically, axially and circumferentially, the upper end of the container having a large major opening entirely overlying the bottom wall in an annual configuration and a small minor opening with an annular configuration partially overlying the base portion with an angled tubular extent coupling the minor opening with the main portion of the container; a large cap with a circular top and downwardly extending side walls positionable over the major opening; a small cap with a circular cover and downwardly extending side walls positionable over the minor opening; a cord of a flexible material coupling the major cap and the minor cap; a level indicator formed of a pulley in an upper region of the side wall having a cord with a float at one end within the container and a weight at the other end outside of the container; and a supplemental tube couple with respect to the minor opening and defining an opening there around to constitute a no-drip spout.

1 Claim, 4 Drawing Sheets

MAPLE SYRUP DISPENSER

BACKGROUND OF THE INVENTION

1. Field of the Invention

The present invention relates to maple syrup bottles and more particularly pertains to maple syrup bottles which may used by a human user for storing and dispensing maple syrup.

2. Description of the Prior Art

The use of maple syrup bottles is known in the prior art. More specifically, maple syrup bottles heretofore devised and utilized for the purpose of storing and dispensing of maple syrup are known to consist basically of familiar, expected and obvious structural configurations, notwithstanding the myriad of designs encompassed by the crowded prior art which have been developed for the fulfillment of countless objectives and requirements.

The prior art discloses a large number of bottles for syrup and other fluids. By way of example, U.S. Pat. No. 4,443,482 to Schopf discloses a polyolefin bottle for buttered table syrup.

U.S. Pat. No. 4,583,651 to Ostberg discloses a novelty bottle cap toy top.

U.S. Pat. No. 5,044,531 to Rhodes discloses a bottle having spill prevention. U.S. Pat. Nos. Des.267,149 to Whorton and 298,514 to Dole disclose designs for syrup bottles.

In this respect, the maple syrup dispensers according to the present invention substantially departs from the conventional concepts and designs of the prior art, and in so doing provides an apparatus primarily developed for the purpose of storing and dispensing maple syrup.

Therefore, it can be appreciated that there exists a continuing need for new and improved maple syrup dispensers which can be easily and economically produced. In this regard, the present invention substantially fulfills this need.

SUMMARY OF THE INVENTION

In view of the foregoing disadvantages inherent in the known types of maple syrup dispensers now present in the prior art, the present invention provides an improved maple syrup dispenser construction wherein the same can be utilized for storing and dispensing maple syrup. As such, the general purpose of the present invention, which will be described subsequently in greater detail, is to provide a new and improved maple syrup dispenser apparatus and method which has all the advantages of the prior art maple syrup dispensers and none of the disadvantages.

To attain this, the present invention essentially comprises a bottle for storing and dispensing maple syrup and like fluids comprising, in combination a one piece container having a generally circular horizontal bottom wall and upstanding side walls of an uneven contour horizontally, vertically, axially and circumferentially, the upper end of the container having a large major opening entirely overlying the bottom wall in an annual configuration and a small minor opening with an annular configuration partially overlying the base portion with an angled tubular extent coupling the minor opening with the main portion of the container a large cap with a circular top and downwardly extending side walls positionable over the major opening a small cap with a circular cover and downwardly extending side walls positionable over the minor opening a cord of a flexible material coupling the major cap and the minor cap a level indicator formed of a pulley in an upper region of the side wall having a cord with a float at one end within the container and a weight at the other end outside of the container; and a supplemental tube couple with respect to the minor opening and defining an opening there around to constitute a no-drip spout.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is a further object of the present invention to provide a new and improved maple syrup dispenser which is of a durable and reliable construction.

An even further object of the present invention is to provide a new and improved maple syrup dispenser which is susceptible of a low cost of manufacture with regard to both materials and labor, and which accordingly is then susceptible of low prices of sale to the consuming public, thereby making such maple syrup dispensers economically available to the buying public.

Still yet another object of the present invention is to provide a new and improved maple syrup dispenser which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
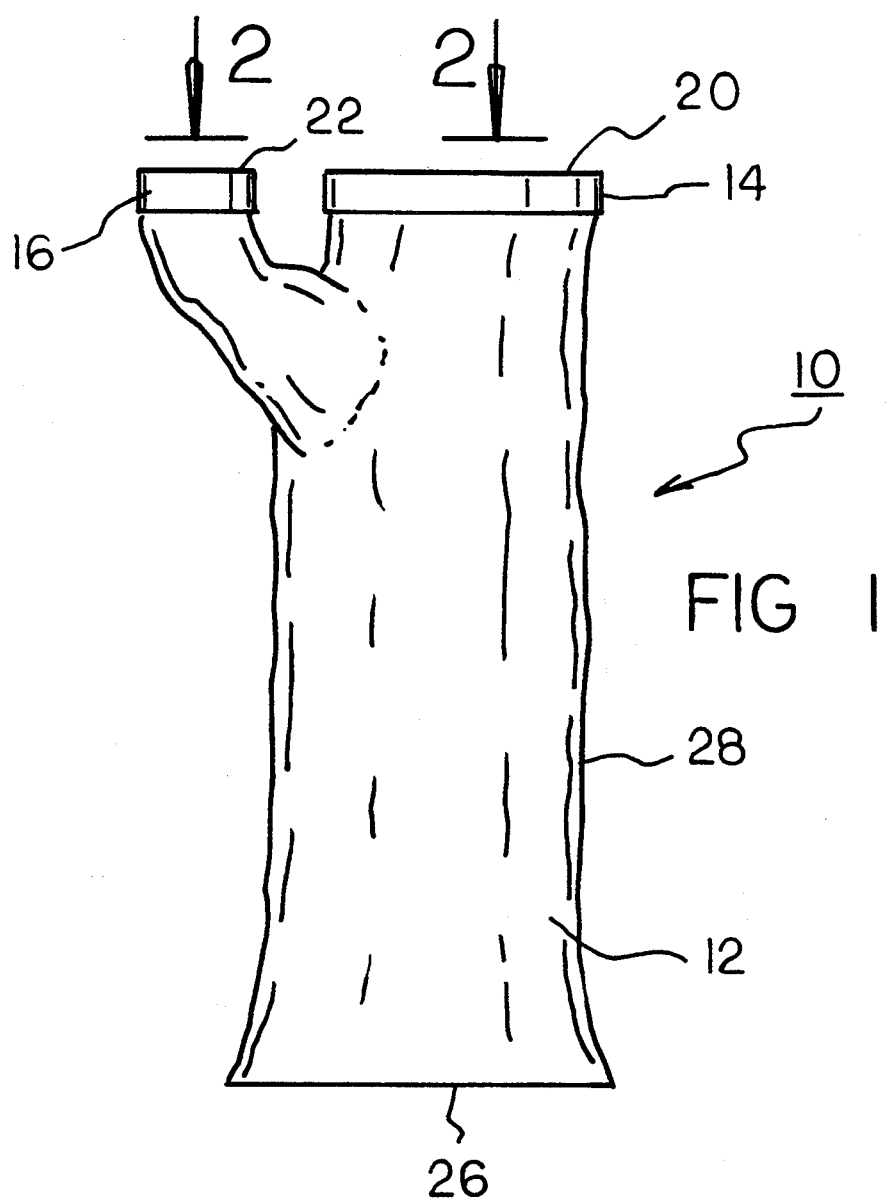
FIG. 1 is a perspective view of the maple syrup dispenser constructed in accordance with the principles of the present invention.
Figure 2:
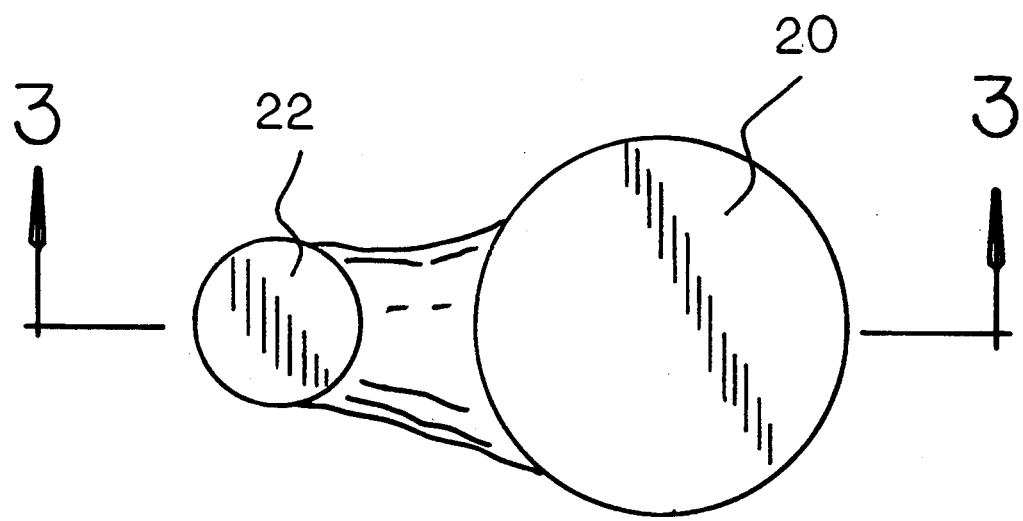
FIG. 2 is a sectional view of the maple syrup dispenser of the prior Figure taken along line 2—2 of FIG. 1.
Figure 3:
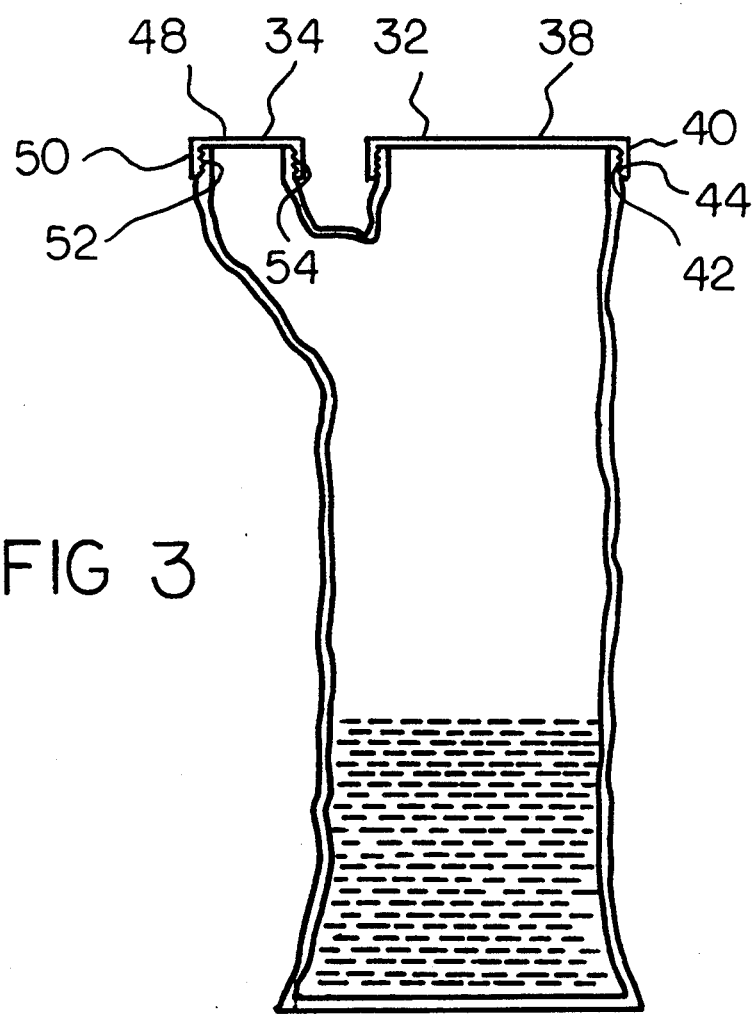
FIG. 3 is a sectional view of the maple syrup dispenser of the prior Figures taken along line 3—3 of FIG. 2.

With reference now to the drawings, and in particular to FIG. 1 thereof, a new and improved maple syrup dispenser embodying the principles and concepts of the present invention and generally designated by the reference numeral 10 will be described.

As can be readily seen in the various figures, the present invention is a bottle 10. The specific bottle is for storing and dispensing maple syrup and like fluids. The bottle 10 from an overview standpoint includes a container 12 having a large major opening 14 and a small minor opening 16. The two opening are at the top of the container 12. Also included is a large cap 20 for covering the large major opening and a small cap 22 for covering a minor opening.

More specifically, the container 12 is formed with a generally circular horizontal bottom wall 26. Extending upwardly between the bottom wall 26 are side walls 28. The side walls are fabricated of an uneven contour horizontally, vertically, axially and circumferentially. This gives the appearance of a distinct nature resembling a tree from which the maple syrup may have been tapped.

At the upper end of the container 28 are two openings. The large and major opening 14 is for filling the container with the fluids to be dispensed therefrom. The smaller minor opening 22 is for dispensing the fluids from the container. The upper ends of the container at the major opening and minor opening are of an angular configuration and are preferably provided with caps thereover to protect the contents of the container from contaminants. In the configuration of the preferred embodiment, the upper large major opening is located entirely over the horizontal bottom wall when the container is resting on a table. The small minor opening 22 overlies only a part of the circular horizontal bottle wall 26. The small minor opening is coupled with the major extent of the container 12 through an angled tubular extent which couples to the major portion of the container in the upper region thereof.

Operable in association with the container 12 are a pair of caps 32 and 34. Cap 32 has a circular upper face 38 with outwardly extending peripheral with a downwardly peripherally wall 40 having internal threads 42, such threads are adapted to mate with threads 44 formed in the exterior surface adjacent the large major opening 20. In similar fashion, the small minor opening 22 is formed of a circular upper plate 48 having downwardly extending side walls 50 and internal threaded teeth 52. The teeth 52 couple with teeth 54 formed in the container adjacent the upper side the of the small minor opening 22.

Figure 4:
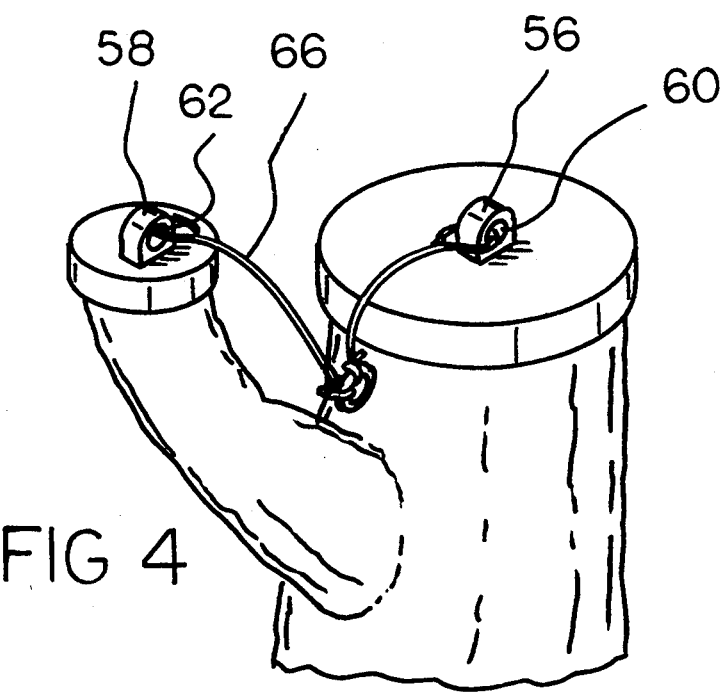
FIG. 4 is a perspective view of a maple syrup dispenser constructed in accordance with an alternate embodiment of the invention.

An alternate embodiment of the invention is disclosed in FIG. 4. According the alternate embodiment, both caps 32 and 34 are provided with upstanding projections 56 and 58. Each of the projections has an aperture 60 and 62. A cord 66 is tied at its opposite ends to the projections centrally on the top of the caps to hold together such caps to preclude inadvertent misplacement or loosing.

Figures 5, 6:
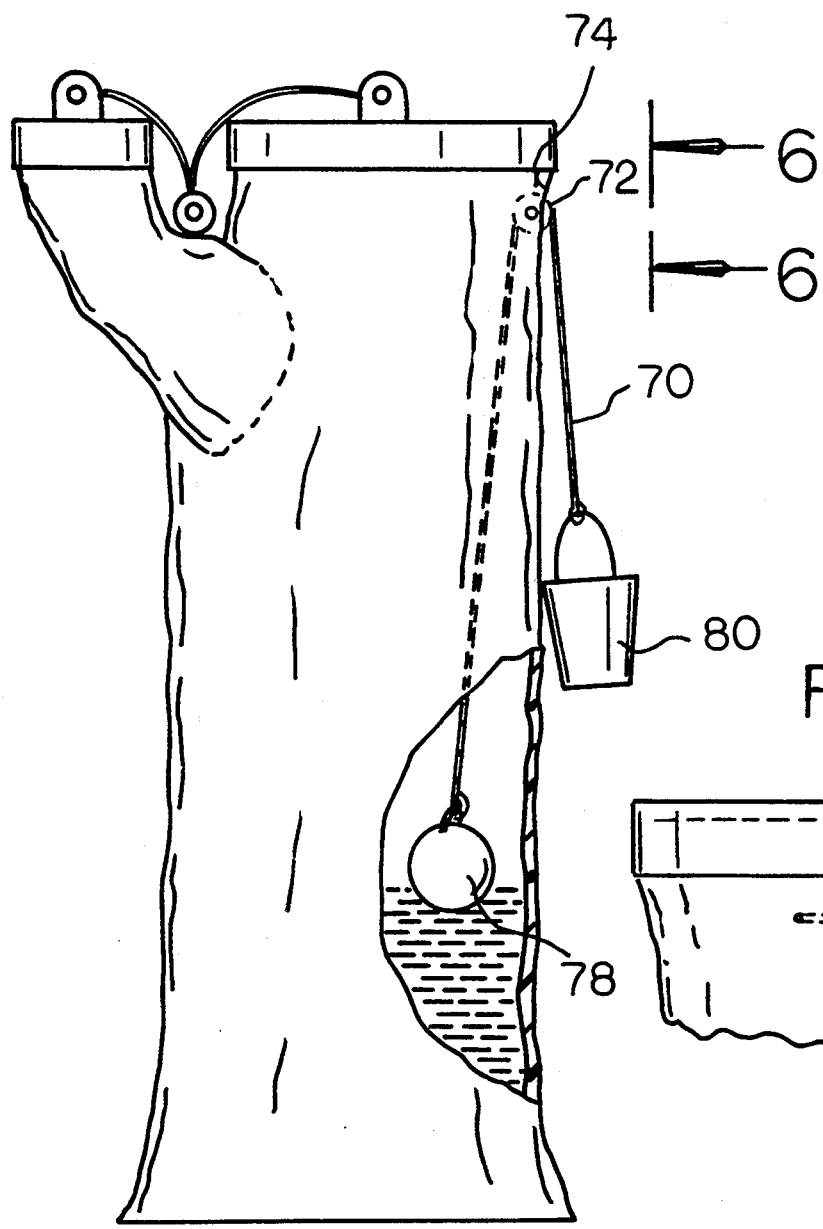
FIG. 5 is a perspective view of a maple syrup dispenser constructed in accordance with another alternate embodiment of the invention.
FIG. 6 is a sectional view of the maple syrup dispenser of the prior Figure taken along line 6—6 of FIG. 5.

A further alternate embodiment of the invention is shown in FIGS. 5 and 6. In accordance with this alternate embodiment, a cord 70 is provided to the trend over a rotatable place 72 the pulley 72 is located in an aperture 74 for rotation about a vertical axis. One end of the cord 70 is provided with a float ball 78 to rest upon the upper surface of the fluid. Weighted pail 80 is secured to the opposite end of the cord. As a result, when the fluid level is reduced, the ball 78 will be lowered and the pale 80 will be raised. This can be interpreted to determine the need to refill the container with maple syrup. When, however, the container is full of maple syrup, the ball 78 rests high on the surface of the fluid and the pail 80 is at a lower orientation adjacent to the bottom of the container, exterior thereof for being reviewed by a user who can readily tell the state of fullness of the container.

Figure 7:
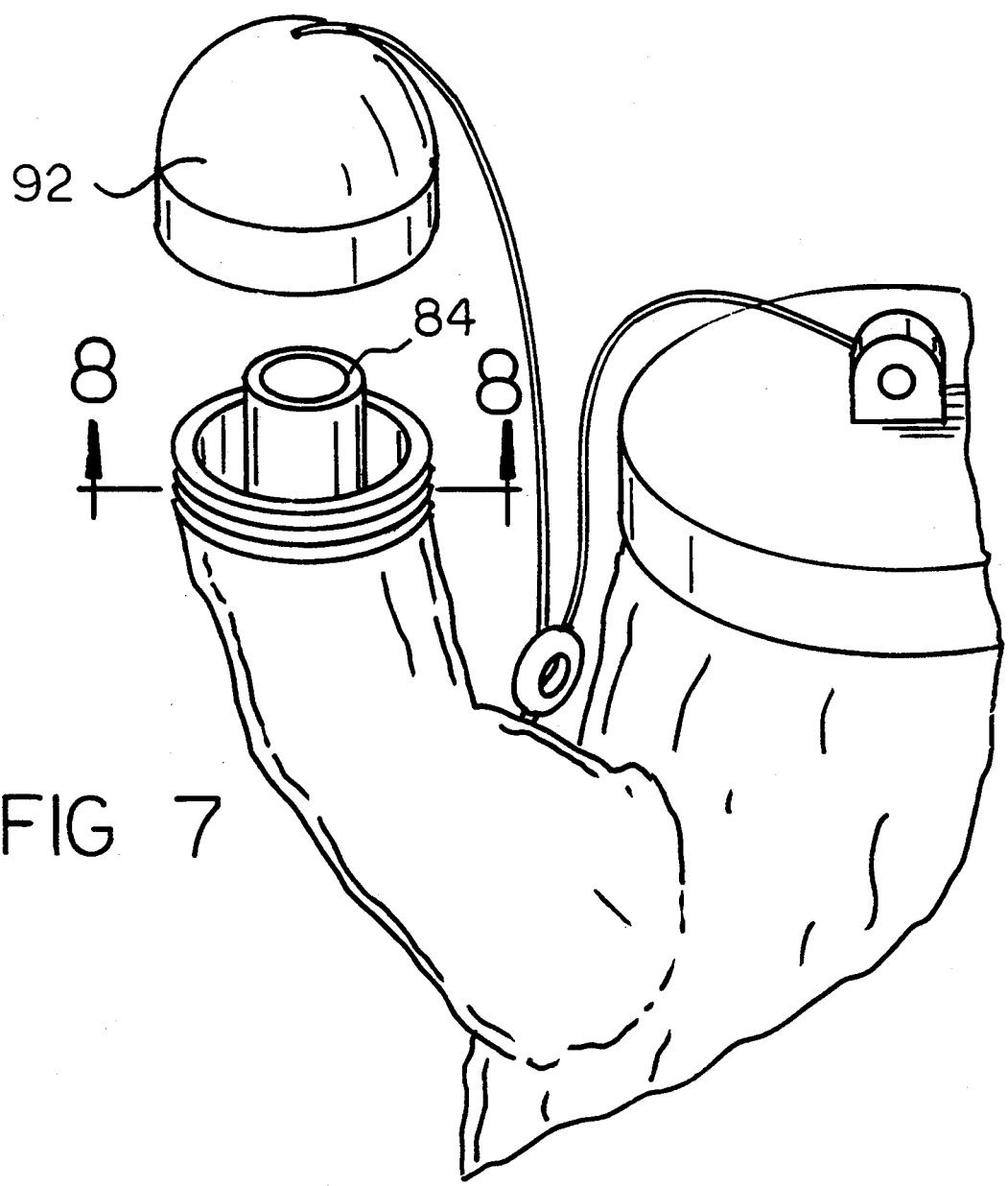
FIG. 7 is a perspective view of a maple syrup dispenser constructed in accordance with yet another alternate embodiment of the invention.
Figure 8:
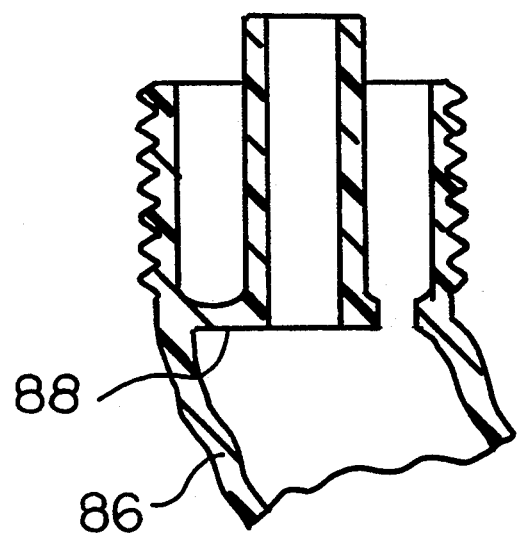
FIG. 8 is a sectional view of the maple syrup dispenser of the prior Figure taken along line 8—8 of FIG. 7.

The last embodiment of the invention is shown in FIGS. 7 and 8. Such embodiments includes a small tubular spout 84. The spout is of a diameter about half that at the upper extent of the small minor opening. The lower end of the spout 88 is coupled to the interior of the angled tubular extent 86 of the container through a cross piece 88 intricately molded with the container. The upper extent of the spout 84 is at a location above the upper extent of the small minor opening. As a result, a modified cap 92 is provided. The modified cap includes a doomed central section as to allow the screwing of the cap onto the small minor opening.

The present invention is a uniquely shaped maple syrup bottle. This innovative bottle offers many desirable features ranging from convenience of use to its novel appearance.

This bottle is constructed from lightweight plastic and is shaped to resemble a tree. The purpose of this design is to provide the consumer with a method of quickly identifying the bottle's contents and the amount which is in the bottle. Cabinets are often cluttered, making it difficult to locate the maple syrup. This bottle's unique shape allows the user to quickly retrieve the syrup.

A simulated branch extends outward from the trunk and serves as the pouring spout. This spout is designed to provide a mess-free method of pouring while reducing the extra syrup from collecting around the edge of the spout. The cap is coupled onto the top of the spout seals the bottle. The surface of the bottle is contoured to form a realistic tree bark texture.

The present invention can be manufactured in half pint, pint, and quart sizes. Its convenience and novel appearance will make it popular for use in restaurants and cafeterias. This invention is simple in design and construction, and its eye-catching appearance will make it stand out from the contemporary syrup containers which occupy shelf space in the retail food market.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A bottle for storing and dispensing maple syrup and like fluids comprising, in combination:

a one piece container having a generally circular horizontal bottom wall and upstanding side walls of an uneven undulating contour horizontally, vertically, axially and circumferentially, the upper end of the container having a large major opening entirely overlying the bottom wall in an annular configuration and a small minor opening with an annular configuration partially overlying the base portion with an angled tubular extent coupling the minor opening with the main portion of the container, the major opening and the minor opening lying in an essentially common horizontal plane;

a large cap with a circular top and downwardly extending side walls positionable over the major opening;

a small cap with a circular cover and downwardly extending side walls positionable over the minor opening;

a cord of a flexible material coupling the major cap and the minor cap;

a level indicator formed of a pulley mounted for rotation in an aperture located in an upper region of the side wall having a cord with a float at one end within the container and a weight at the other end outside of the container; and a supplemental tube coupled with respect to the minor opening and defining an opening there around to constitute a no-drip spout.

* * * * *